(12) United States Patent
Denda et al.

(10) Patent No.: US 7,595,137 B2
(45) Date of Patent: Sep. 29, 2009

(54) METHOD OF MANUFACTURING COLOR FILTER SUBSTRATE, COLOR FILTER SUBSTRATE, DISPLAY DEVICE AND ELECTRONIC APPARATUS

(75) Inventors: Atsushi Denda, Chino (JP); Toshimitsu Hirai, Chino (JP)

(73) Assignee: Seiko Epson Corporation (JP)

( * ) Notice: Subject to any disclaimer, the term of this patent is extended or adjusted under 35 U.S.C. 154(b) by 509 days.

(21) Appl. No.: 11/466,918

(22) Filed: Aug. 24, 2006

(65) Prior Publication Data

US 2007/0048634 A1    Mar. 1, 2007

(30) Foreign Application Priority Data

Aug. 25, 2005    (JP)    ............................... 2005-243734
Aug. 4, 2006    (JP)    ............................... 2006-212912

(51) Int. Cl.
  *H01L 21/02*    (2006.01)
  *G02B 5/20*    (2006.01)
(52) U.S. Cl. .......................................... 430/7; 347/107
(58) Field of Classification Search ........................ None
  See application file for complete search history.

(56) References Cited

U.S. PATENT DOCUMENTS

2002/0060757 A1 *   5/2002   Kiguchi et al. ................. 349/43
2005/0008770 A1    1/2005   Kawase
2005/0058785 A1 *   3/2005   Uhlig et al. .............. 428/32.24

FOREIGN PATENT DOCUMENTS

| CN | 1573368 | 2/2005 |
|---|---|---|
| JP | 05-257153 | 10/1993 |
| JP | 2000-314806 | 11/2000 |
| JP | 2004-094206 | 3/2004 |
| JP | 2004-355995 | 12/2004 |

OTHER PUBLICATIONS

Computer-generated translation of JP 2000-314806 (Nov. 2000).*
Computer-generated translation of JP 5-257153 (Oct. 1993).*

* cited by examiner

*Primary Examiner*—John A. McPherson
(74) *Attorney, Agent, or Firm*—Harness, Dickey & Pierce, P.L.C.

(57) ABSTRACT

A method of manufacturing a color filter substrate having a transparent conductive film and colorant material on a substrate includes: forming a bank on the substrate; disposing a liquid material including transparent conductive micro particles in an area defined by the bank; forming the transparent conductive film by baking the transparent conductive micro particles; impregnating gaps among the transparent conductive micro particles in the transparent conductive film with the colorant material, and baking the colorant material.

5 Claims, 10 Drawing Sheets

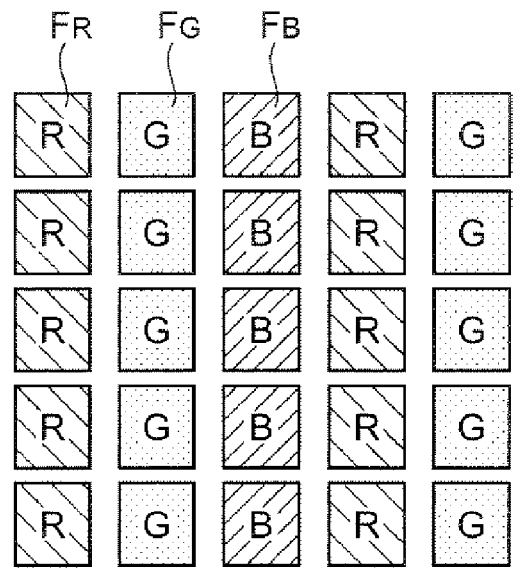
FIG.10A STRIPE
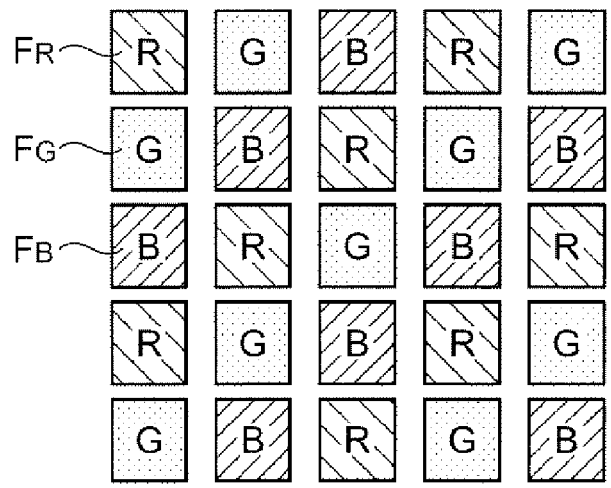
FIG.10B MOSAIC
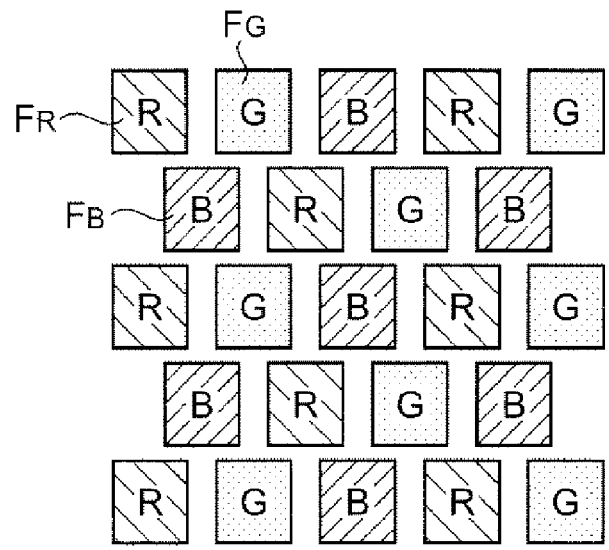
FIG.10C DELTA

METHOD OF MANUFACTURING COLOR FILTER SUBSTRATE, COLOR FILTER SUBSTRATE, DISPLAY DEVICE AND ELECTRONIC APPARATUS

BACKGROUND OF THE INVENTION

1. Technical Field

The present invention relates to a method of manufacturing a color filter substrate, a color filter substrate, a display device and electronic equipment.

2. Related Art

In recent years, development of a so-called color filter on array (COA) structure which is a color filter formed on an array substrate has been carried out. With the COA structure, it is not necessary to align the array substrate on which the color filter is formed with an opposing substrate on which electrodes are formed throughout the surface, so that the manufacturing process can be simplified. In addition, it is possible to freely design a pattern formed on the substrates without considering a positioning error of the substrates because a problem of the alignment accuracy at the time of combining the substrates does not arise. JP-A-2000-314806 is a first example of related art, JP-A-2004-355995 is a second example of related art and JP-A-2004-94206 is a third example of related art. For example, a width of a light shielding layer can be made smaller as described in the first example. This allows a display device to have a high aperture ratio.

As a method of manufacturing a color filter in the color filter on array (COA) structure, a dyeing method, a pigment dispersion method, an electrodeposition method, a film transfer method and the like have been developed. The first example disclosed the following method to form a color filter. First, a transparent conductive film which is patterned in advance is immersed into a solution of water-soluble polymer in which pigments are dispersed. The transparent conductive film is then electrified so that the pigments are electrodeposited on the transparent conductive film.

Other color filter manufacturing method using an ink-jet method has also been studied. In the color filter manufacturing method using the ink-jet method, for example, a mixture of a transparent conductive film material such as indium tin oxide (ITO) and $SnO_2$ and a color filter material such as pigments is patterned so as to form a color filter by a photolithography method or various printing methods.

According to the above-mentioned electrodeposition method, the color filter is formed by electrodepositing the pigments onto the transparent conductive film. This means that each transparent conductive film has to be electrically conductive and this limits layout patterns of the color filter. For example, the color filter can not be separately disposed by each pixel. Furthermore, since a relatively high voltage is applied to the transparent conductive film, a so-called bipolar phenomenon occurs between two adjacent transparent conductive film patterns and colors of the color filter could be mixed. On the other hand, according to the ink-jet patterning method in which the mixture of the transparent conductive film material and the pigments is patterned, a heat treatment that imparts sufficient conductivity to the transparent conductive film cannot be performed because there is a temperature limit due to the decomposition temperature of the pigments. Therefore, a transparent conductive film formed by sputtering had to be used at the same time.

SUMMARY

An advantage of the present invention is to provide a conductive color filter substrate having a high conductivity and a fine color property, a manufacturing method thereof, a high quality display device and electronic equipment having such color filter substrate.

A method of manufacturing a color filter substrate having a transparent conductive film and colorant material on a substrate according to one aspect of the invention includes forming a bank on the substrate, disposing a liquid material including transparent conductive micro particles in an area defined by the bank, forming the transparent conductive film by baking the transparent conductive micro particles, impregnating gaps among the transparent conductive micro particles in the transparent conductive film with the colorant material, and baking the colorant material.

According to such manufacturing method, a color filter is formed by impregnating the gaps among the transparent conductive micro particles with the colorant material. Therefore, unlike the electrodeposition method, the manufacturing method can be applied to any layouts of the color filter such as stripe and delta arrangement patterns and various structures.

Moreover, the colorant material is impregnated and baked after the transparent conductive film has formed according to the above-mentioned method. Therefore, the baking temperature of the transparent conductive film can be set to a higher temperature than the decomposition temperature of the colorant material. This makes it possible to obtain fine film conductivity.

Furthermore, the bank for the transparent conductive film can also be used as the bank for the colorant material according to above-mentioned method. Therefore, the manufacturing process can be simplified and it is possible to cut cost.

The transparent conductive film composed of the transparent conductive micro particles has a smaller film density compared to that of the film formed by sputtering and the like so that the transmissivity will not sharply decrease even if the film thickness increases. Therefore, the thickness of the transparent conductive film which is the base film can be easily controlled according to the required color properties (hue, brightness, saturation and the like) of the color filter.

In this case, the gaps in the film may be impregnated with the colorant material by disposing a liquid material including the colorant material in the area defined by the bank. The liquid material including the colorant material may be disposed in the area by a droplet discharge method.

In this way, more than one color colorant materials can be easily applied to the corresponding position at the same time.

In this case, the liquid material including the transparent conductive micro particles may be provided in the area by the droplet discharge method.

By using the droplet discharge method, the consumption of liquid material becomes less and the amount and position of the functional liquid disposed on the substrate can be easily controlled, compared to the other coating techniques such as a spin coating method.

In this case, the bank may be made of material that has a polysiloxane framework.

According to this method, the bank is made of the material that has a polysiloxane framework so that its heat resistance increases compared to a bank made of other material such as organic material. Accordingly, it is possible to perform a high temperature treatment to bake the transparent conductive film.

According to a second aspect of the invention, a color filter substrate includes an electrode composed of a plurality of conductive micro particles and colorant material, the conductive micro particles aggregating in such a way that a part of the conductive micro particles contacts with the adjacent conductive micro particles but gaps are left among the conductive micro particles, and the colorant material filling the gaps.

According to the second aspect of the invention, it is possible to combine the conductive micro particles treated with a heat treatment with the appropriate temperature irrespective of the heat resistance of the colorant material, and the colorant material treated with a heat treatment with a lower temperature. These two elements are combined such that both are exposed on the surface. By combining these two elements, it is possible to serve as an electrode that supplies a voltage to a substance that contacts with the surface. Therefore, according to second aspect of the invention, the color filter can satisfy both functions of the electrode and the color filter that colors a transmitted light beam at a high level.

It is preferable that a size of the conductive micro particle-should be 5-70 nm.

By using the conductive micro particles in such size, it is possible to secure the necessary conductivity as the electrode without losing a property of the colorant material as a filling. Consequently, the color filter can satisfy both functions of the electrode and the color filter that colors a transmitted light beam at a higher level.

It is preferable that the electrode should be surrounded by a bank.

By surrounding the area by the bank, it is possible to provide different amount and kinds of the conductive micro particles or the colorant material to different pixels. In other words, an appropriately thick conductive micro particles layer can be impregnated with, for example, three different colorant materials such as three primary colors, which are red, green and blue. In this way, the color filter can satisfy both functions of the electrode and the color filter that colors a transmitted light beam at a higher level.

It is also preferable that the bank should be made of material that has a polysiloxane framework.

Polysiloxane has a higher heat resistance compared to other material such as organic material. Therefore, it is possible to freely set the temperature of the heat treatment of the conductive micro particles. Accordingly, it is possible to form a fine electrode.

It is preferable that the electrode should be a pixel electrode, which is independently controlled by pixel unit and placed on/above an element that controls the electrode, and the bank should be made of an insulating material.

In this way, each electrode can be independently controlled with the element and this make a finer display available.

It is preferable that a transparent conductive material layer that electrically couples each electrode should be provided on the whole upper face of the substrate including the bank that is made of an opaque material.

In this way, each electrode is electrically coupled and the bank can serve as a black matrix. Consequently, the color filter substrate can be used as an opposing substrate.

According to a third aspect of the invention, a display device includes a color filter substrate having an electrode that is composed of a plurality of conductive micro particles and colorant material, the conductive micro particles aggregating in such a way that a part of the conductive micro particles contacts with the adjacent conductive micro particles but gaps are left among the conductive micro particles, and the colorant material filling the gaps.

Since the display device has the color filter substrate that can satisfy both functions of the electrode and the color filter that colors a transmitted light beam at a high level, it is possible to obtain a display device with a high display quality.

It is preferable that a size of the conductive micro particle-should be 5-70 nm.

In this way, the display device has the color filter substrate that can satisfy both functions of the electrode and the color filter that colors a transmitted light beam at a high level so that it is possible to obtain a display device with a high display quality.

It is preferable that the electrode should be surrounded by a bank.

In this way, the display device has the color filter substrate that can satisfy both functions of the electrode and the color filter that colors a transmitted light beam at a high level so that it is possible to obtain a display device with a high display quality.

It is also preferable that the bank should be made of material that has a polysiloxane framework.

Since the display has the color filter substrate including a fine electrode, it is possible to obtain a display device with a higher display quality.

It is preferable that the electrode should be a pixel electrode that is independently controlled by pixel unit and placed on/above an element that controls the electrode.

In this way, each electrode can be independently controlled with the element and this makes it possible to obtain a display device with a higher display quality.

It is preferable that a transparent conductive material layer that electrically couples each electrode should be provided on the whole upper face of the substrate including the bank that is made of an opaque material.

In this way, the color filter substrate can be used as an opposing substrate, and it is possible to obtain a display device with a higher display quality.

According to a fourth aspect of the invention, electronic equipment includes a display device equipped with a color filter substrate having an electrode that is composed of a plurality of conductive micro particles and colorant material, the conductive micro particles aggregating in such a way that a part of the conductive micro particles contacts with the adjacent conductive micro particles but gaps are left among the conductive micro particles, and the colorant material filling the gaps.

Since the electronic equipment has the color filter substrate that can satisfy both functions of the electrode and the color filter that colors a transmitted light beam at a high level, it is possible to obtain electronic equipment with a high display quality.

It is preferable that a size of the conductive micro particles be 5-70 nm.

In this way, the display device has the color filter substrate that can satisfy both functions of the electrode and the color filter that colors a transmitted light beam at a high level so that it is possible to obtain electronic equipment with a high display quality.

It is preferable that the electrode be surrounded by a bank.

In this way, the display device has the color filter substrate that can satisfy both functions of the electrode and the color filter that colors a transmitted light beam at a high level so that it is possible to obtain electronic equipment with a high display quality.

It is also preferable that the bank be made of material that has a polysiloxane framework.

Since the display has the color filter substrate including a fine electrode, it is possible to obtain electronic equipment with a higher display quality.

It is preferable that the electrode be a pixel electrode that is independently controlled by pixel unit and placed on/above an element that controls the electrode.

In this way, each electrode can be independently controlled with the element and this makes it possible to obtain electronic equipment with a higher display quality.

It is preferable that a transparent conductive material layer that electrically couples each electrode be provided on the whole upper face of the substrate including the bank that is made of an opaque material.

In this way, the color filter substrate can be used as an opposing substrate, and it is possible to obtain electronic equipment with a higher display quality.

BRIEF DESCRIPTION OF THE DRAWINGS

The invention will be described with reference to the accompanying drawings, wherein like numbers reference like elements.

FIG. 10 is a plan view showing an example of a color filter layout.

DESCRIPTION OF EXEMPLARY EMBODIMENTS

Figure 1:
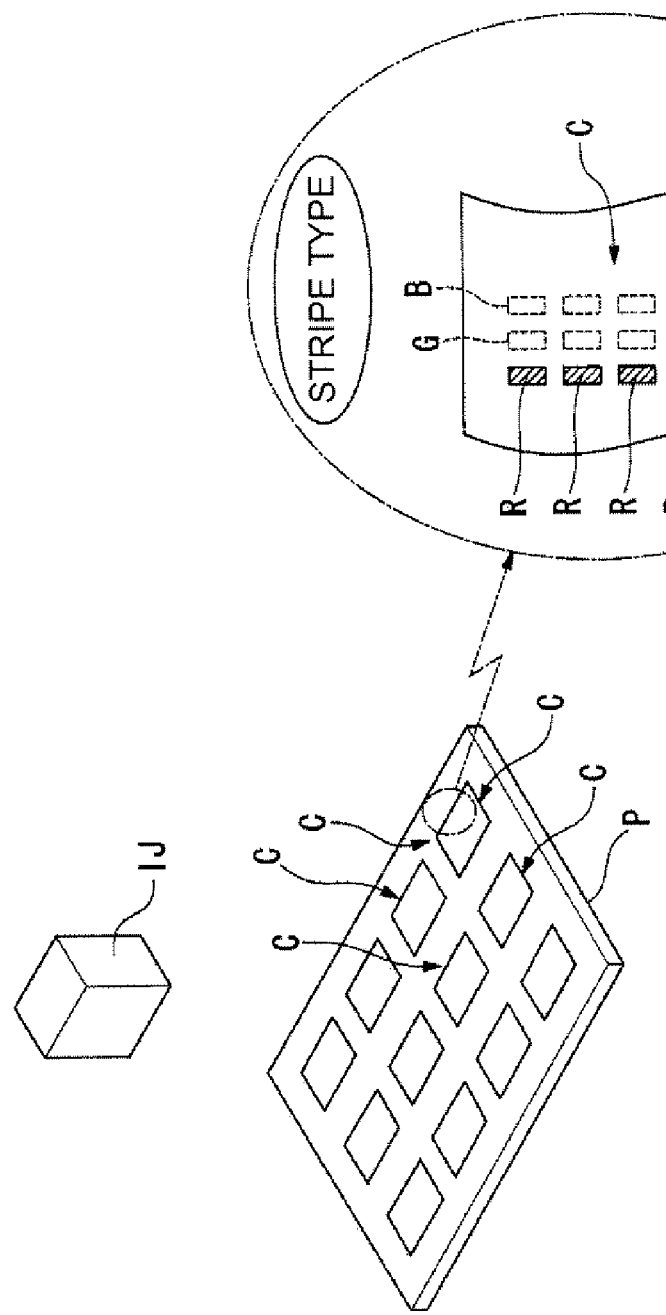
FIG. 1 is a perspective view showing an example of a color filter substrate according to the present invention.

Embodiments of the invention will be described with reference to the accompanying drawings. In the drawings, a scale size of an element may be different from the real element in order to make it recognizable. It is note that the invention will be hereinafter described in different order from the order of the invention title written above.

Substrate

FIG. 1 shows an example of a relation between a base substrate P and a color filter substrate according to the invention. In the color filter substrate according to the invention, the color filter itself has conductivity so that the color filter can serve other function such as an electrode in addition to the original function of a color filter. Such color filter can be preferably adopted to display devices including a liquid crystal display device.

In this embodiment, a color filter area C is provided in the plural number in matrix on the rectangular substrate P as shown in FIG. 1 in order to improve productivity. The substrate P is cut and divided into each color filter area C at the end of the manufacturing process, and each color filter area C can be used as a color filter that conforms to a liquid crystal display and the like. A liquid material including red (R) colorant, a liquid material including green (G) colorant and a liquid material including blue (B) colorant are respectively patterned in a prescribed shape in the color filter area C.

Display Device

Next, as an embodiment of a display device according to the invention, an active-matrix type color liquid crystal display device having thin film transistors (hereinafter called "TFTs") as pixel switching elements and that has the color filter substrate according to the invention is described with reference to FIG. 2 and FIG. 3. A first embodiment of the liquid crystal display designated as 100A is shown in FIG. 2, and a second embodiment of the liquid crystal display designated as 100B is shown in FIG. 3.

Figure 2:
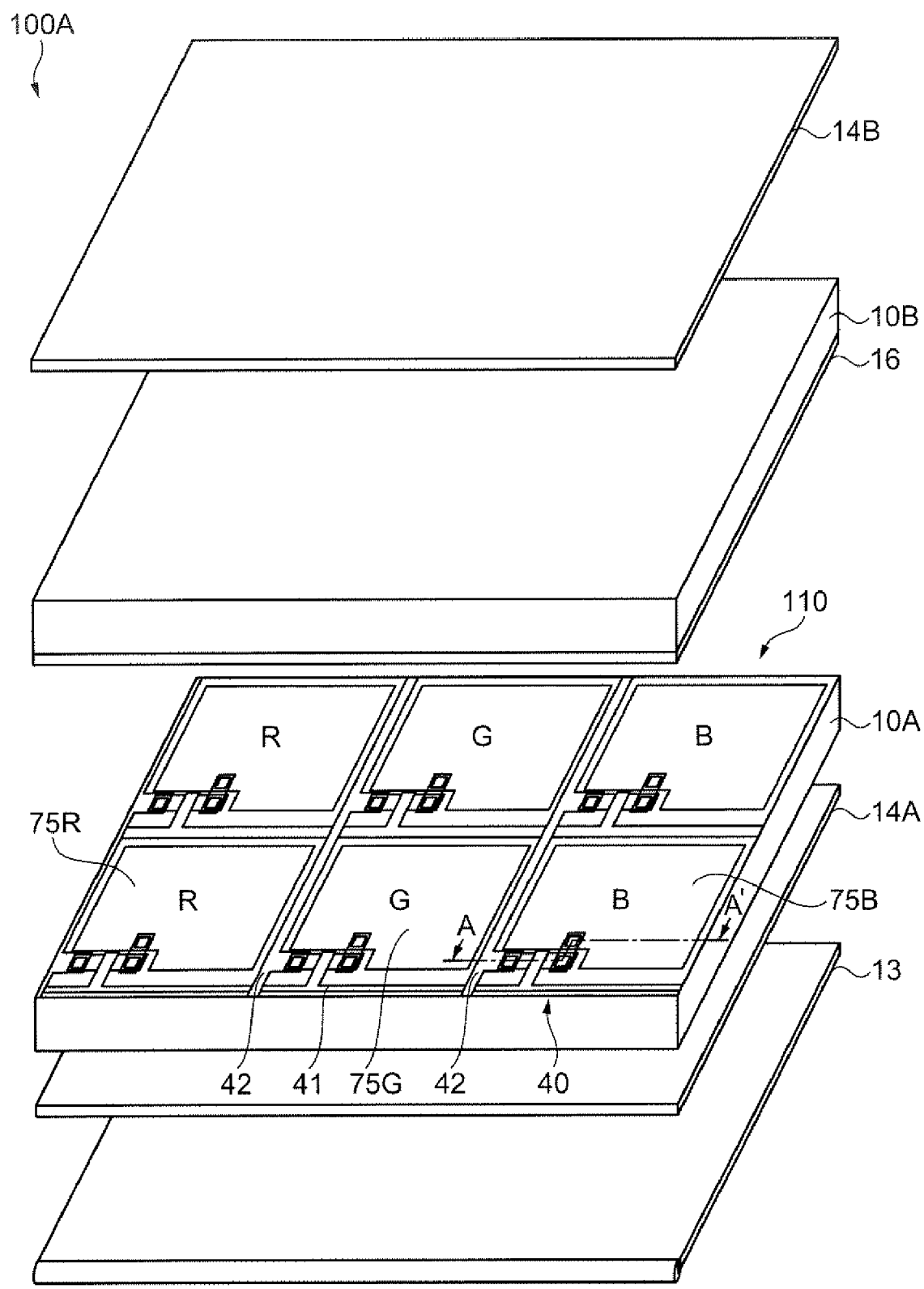
FIG. 2 is a perspective view of a display device according to a first embodiment of the invention.
Figure 3:
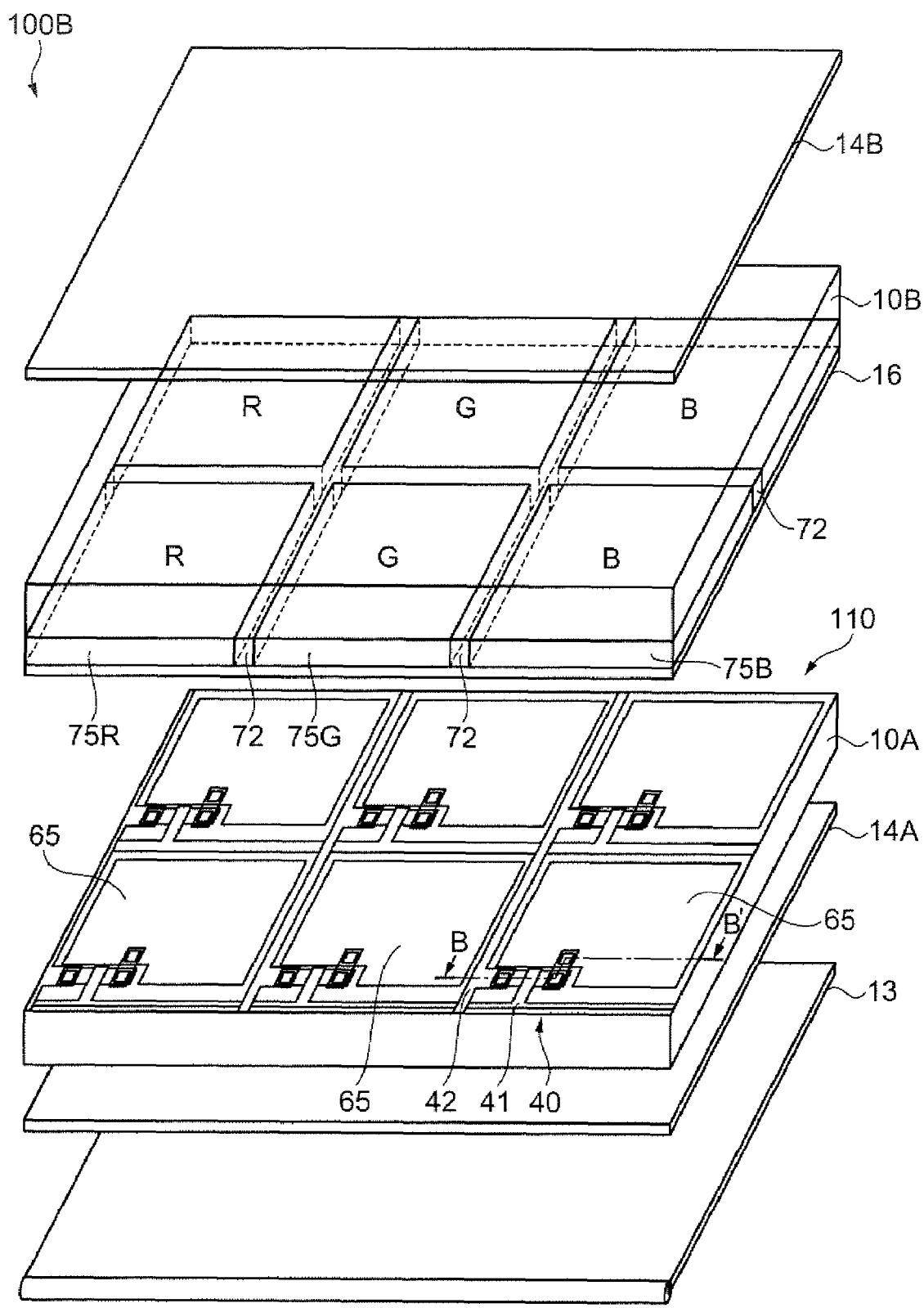
FIG. 3 is a perspective view of a display device according to a second embodiment of the invention.

The display device 100A according to the first embodiment of the invention has a TFT array substrate 10A on which color filters 75R, 75G, 75B are arranged in order as shown in FIG. 2. The display device 100B according to the second embodiment of the invention has an opposing substrate 10B on which the color filters 75R, 75G, 75B of the three primary colors are formed as shown in FIG. 3. The color filter 75 can also serve as a pixel electrode, which will be described in detail later. In this sense, the identical member in the first embodiment can be described in two ways, as the color filter or the pixel electrode. It is note that "color filter 75" is hereinafter used when the color of the color filter is not the subject. The color filter formed on the TFT array substrate 10A shown in FIG. 2 will now be described. The second embodiment shown in FIG. 3 has mostly the same structure as that of the first embodiment except that the color filter is formed in a different position. Therefore, only different points from the first embodiment will be described.

It is note that the color filter substrate means a substrate on which a color filter is formed. In case that the color filter is formed on a TFT array substrate, the TFT array substrate is the color filter substrate. In the same way, in case that the color filter is formed on an opposing substrate, the opposing substrate is the color filter substrate.

The liquid crystal display device 100A includes the TFT array substrate 10A and the opposing substrate 10B that opposes the TFT array substrate 10A as shown in FIG. 2. The TFT array substrate 10A and the opposing substrate 10B are adhered together with an unshown sealing member that is provided on the rim of the substrate opposing faces and has a rectangular frame shape. A liquid crystal layer 70 (see FIG. 4 and FIG. 5) which is an electrooptical material is enclosed (retained) in an area (a cell gap) surrounded by the substrates 10A, 10B and the unshown sealing member.

An optical member 14A and/or 14B such as a retardation plate and a polarizing plate is provided outside the TFT array substrate 10A and the opposing substrate 10B. These are set in a predetermined direction according to an adopted liquid crystal mode. The liquid crystal mode includes operational modes such as a twisted nematic (TN) mode, a vertical alignment (VA) mode, an optically compensated bend (OCB) mode, an in-plain switching (IPS) mode and a super twisted nematic (STN) mode, and normally white/black mode. A lighting device 13 such as a backlight unit is further provided outside the optical member 14A that is provided on the side of the TFT array substrate 10A.

A picture element 110 is formed in the plural number in matrix in the liquid crystal display device 100A. A TFT 40 for switching the picture element is formed in each picture element 110. A data line 42 supplying a pixel signal is electrically coupled a source 47 of the TFT 40 (see FIG. 4 and FIG.

5). Pixel signals written in the data lines 42 can be sequentially supplied to each data line or can be provided to each group of the data lines 42 that are arranged next to each other. A gate of the TFT 40 is formed by extending a part of a scan line 41. A scan signal that is a pulse wave is sequentially applied to each scan line 41 at certain timing. A pixel electrode 75 is electrically coupled to a drain of the TFT 40. While the TFT 40 that is a switching element is turned on, a pixel signal supplied from the data line 42 is written into each pixel at a prescribed timing. The pixel signal that has a predetermined level and is written into the liquid crystal layer 70 through the pixel electrode 75 in the above-mentioned way is retained between the opposing substrate 10B and an opposing electrode 16 for a certain period.

The pixel electrode 75 is formed of transparent conductive micro particles. In order to impart the color filter function, colorant material such as pigments is impregnated among the transparent conductive micro particles. More specifically, a pixel electrode $75_R$ placed in a red picture element is impregnated with a red colorant material, a pixel electrode $75_G$ positioned in a green picture element is impregnated with a green colorant material, and a pixel electrode $75_B$ positioned in a blue picture element is impregnated with a blue colorant material. Each pixel electrode 75 ($75_R$, $75_G$, $75_B$) applies a voltage to the liquid crystal layer 70. At the same time, the pixel electrode 75 absorbs or reflects a part of a light ray that passed through the liquid crystal layer 70 and emits it as a colored light ray. In other words, a color filter is provided on the TFT array substrate 10A and the pixel electrode serves as the color filter. This structure is called a color filter-on-array structure.

Meanwhile, the opposing electrode 16 is formed on the whole surface of the opposing substrate 10B as a common electrode and it does not have a black matrix that defines the picture elements. Therefore, the opposing substrate 10B does not have to be precisely aligned with the TFT array substrate 10A. In other words, the disposition of the opposing substrate 10B will not occur so that the display quality can be improved.

The TFT array substrate 10A having such pixel electrodes 75 is manufactured by a hereinafter described method of manufacturing a color filter substrate according to the invention. More specifically, a circuit part including wirings such as the scan lines 41 and the data lines 42 and switching elements such as the TFTs 40 is firstly formed on the surface of the TFT array substrate 10A, a bank that separates each picture element 110 is then formed. Secondly, a liquid material including the transparent conductive micro particles is provided in a region partitioned with the bank, and then the transparent conductive film is formed by baking the transparent conductive micro particles. Thirdly, the colorant material is impregnated in the gaps among the transparent conductive micro particles in the transparent conductive film and then baked. In order to lower the resistance of the pixel electrode 75, a temperature at which the transparent conductive film is baked is preferably set to be as high as possible but lower than the upper temperature limit of the bank and the TFT 40. A temperature at which the colorant material is baked can be set to a requisite minimum within a rage of the decomposition temperature of the colorant material because the colorant material baking is separately performed from the transparent conductive film baking.

Next, the ease where the invention is applied to the color filter that is formed on the opposing substrate 10B is described.

FIG. 3 shows the second embodiment in which the color filter 75 (R, G, B) is separately formed from a pixel electrode 65. The pixel electrode 65 that is coupled to the TFT 40 is formed on the TFT array substrate 10A. The color filter 75 (R, G, B) is formed in a position where corresponds to the position of the pixel electrode on the opposing substrate 10B.

In the same way as the color filter 75 (R, G, B) is formed in the above-described first embodiment, a color filter is formed on the opposing substrate 10B. Firstly, a bank 72 is vertically or horizontally formed on the opposing substrate 10B. The aggregate of the transparent conductive micro particles is formed in an area surrounded by the banks, and the gaps in the aggregate are then impregnated with the micro particles colorant material such as pigments by a hereinafter-described ink-jet method. The bank 72 also serves as a black matrix that defines each color filter area so that the bank is formed of an opaque material. Alternatively, the black matrix may be separately formed under the bank 72. Here, the color filter substrate means the substrate on which a color filter is formed according to the invention. Accordingly, the opposing substrate 10B is the color filter substrate in this embodiment.

Unlike the TFT array substrate 10A, the opposing substrate 10B does not have wirings connecting the picture elements but should have the common electric potential in the whole area. Therefore, a transparent conductive film is formed on the whole surface of the opposing substrate 10B by sputtering and the like after the color filter is formed on the opposing substrate 10B in the above-mentioned way. The transparent conductive film can be made of a transparent conductive material such as indium tin oxide (ITO), indium zinc oxide (IZO), fluorine doped tin oxide (FTO) and $SnO_2$, and other thin metal films such as a some nanometers thick film of Ag, Ni which can be translucent when it is very thin. Generally, the thinner the conductive film becomes, the higher the plane resistance becomes. However, according to the embodiment, the color filter itself has the conductivity and serves as a secondary electrode so that it is possible to obtain a high-quality display.

Though the liquid crystal display devices 100A, 100B shown in FIG. 2 and FIG. 3 were described as the liquid crystal display device having the thin film transistors which are the pixel switching elements, the present invention can also be applied to a liquid crystal display device having thin film diodes (TFDs) as the pixel switching elements and a passive-matrix type liquid crystal display device.

Color Filter Substrate

Figure 4:
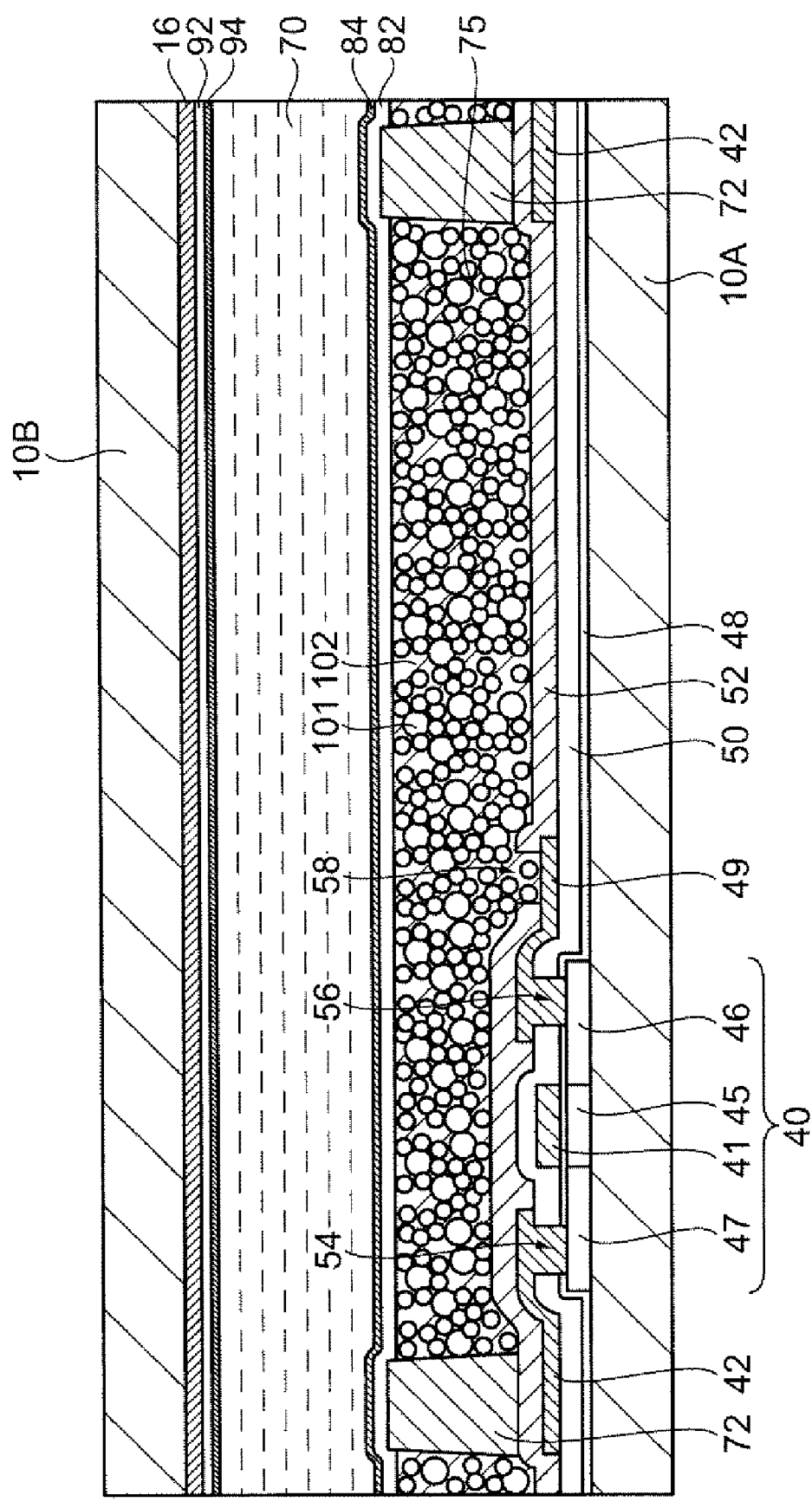
FIG. 4 is a sectional view of a color filter according to the first embodiment of the invention.
Figure 5:
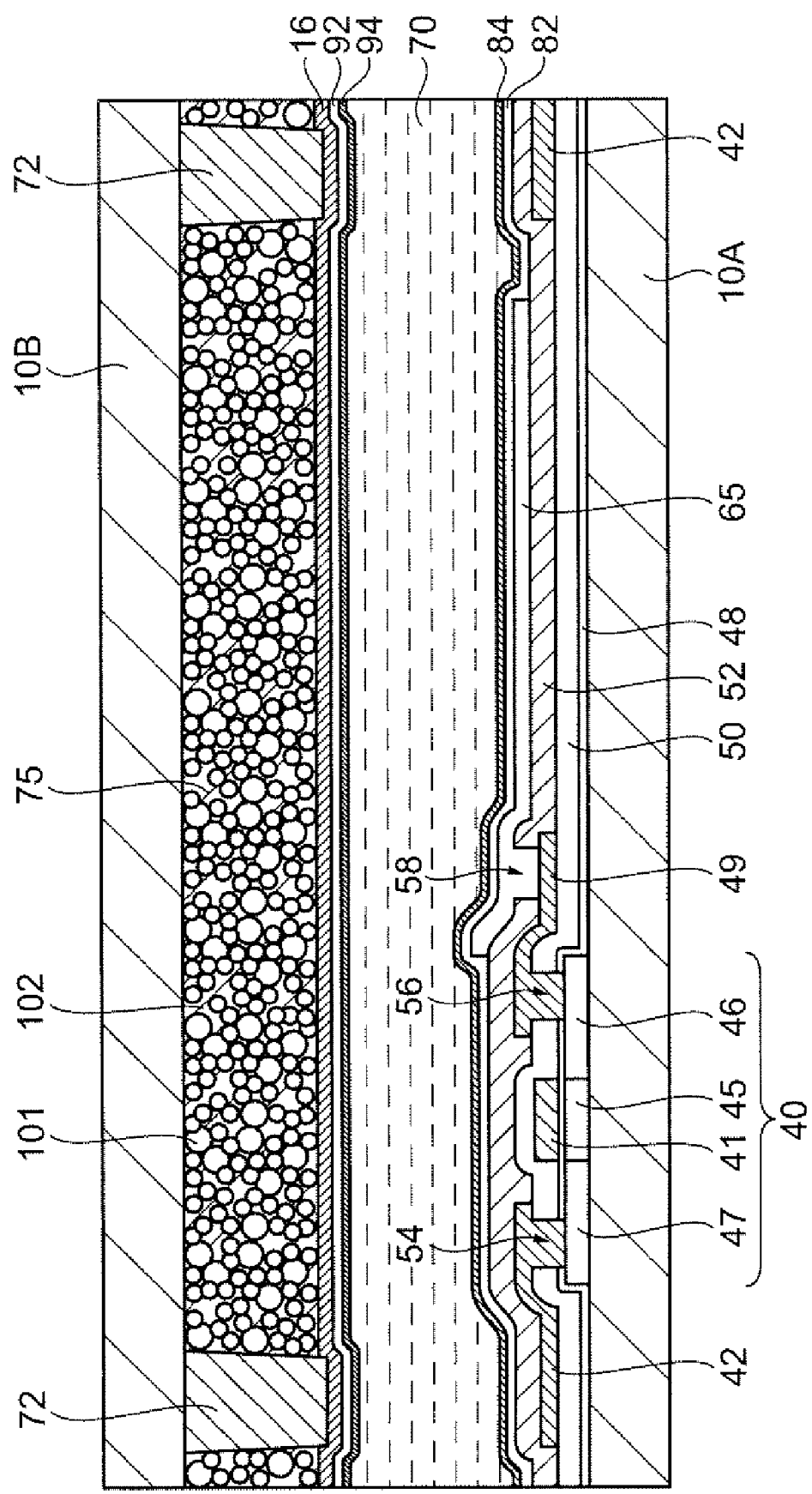
FIG. 5 is a sectional view of a color filter according to the second embodiment of the invention.

Next, the color filter substrate according to the above-described embodiment is described with reference to FIG. 4 and FIG. 5. FIG. 4 shows the color filter substrate part in a single picture element together with the TFT 40 that controls the picture element in the display device according to the first embodiment. FIG. 4 is the sectional view along the line A-A' in FIG. 2. FIG. 5 shows the color filter substrate part in a single picture element in the display device according to the second embodiment and is the sectional view along the line B-B' in FIG. 3. The optical member 14A, 14B and the lighting device 13 are omitted in these two drawings.

In the same way as the above-description of the display device, the first embodiment in which the color filter is formed on the TFT array substrate 10A shown in FIG. 4 will be mainly described. The second embodiment shown in FIG. 5 has mostly the same features as those of the first embodiment except that the color filter is formed in the different position so that only different features will be hereinafter described.

The color filter substrate according to this embodiment includes the TFT 40 formed on the TFT array substrate 10A, the pixel electrode 65 coupled to the TFT 40 and the color filter layer 75. The liquid crystal layer 70 is disposed between the color filter substrate and the opposing substrate 10B.

The TFT 40 includes the source region 47, a drain region 46, a channel region 45 where a channel is formed between the source region 47 and the drain region 46, and a gate electrode. The gate electrode is formed by extending the scan lines 41 that opposes the channel region 45 through a gate insulating film 48. A first contact hole 54 and a second contact hole 56 are formed in a first interlayer insulating layer 50 that is formed on the gate electrode.

An extended part of the data line 42 is electrically coupled to the source region 47 through the first contact hole 54 in the source region 47. In the drain region 46, a relay electrode 49 is formed through the second contact hole 56 formed in the first interlayer insulating layer 50. A second interlayer insulating layer 52 is further formed on the first interlayer insulating layer 50. A third contact hole 58 is formed in the second interlayer insulating layer 52 and above the relay electrode 49. The relay electrode is coupled to the color filter layer 75 that is formed above the second interlayer insulating layer 52 through the third contact hole 58.

The color filter layer 75 is formed in the area surrounded by the bank 72 formed on the second interlayer insulating layer by the ink-jet method (an ink-jet device used here will be described later).

The color filter 75 is conductive, translucent and colored member and it colors (imparts chromaticity to) the white light beam emitted from the lighting device 13. More specifically, the color filter 75 is composed of a plurality of the conductive micro particles 101 and the colorant material 102. The conductive micro particles aggregate in such a way that a part of the conductive micro particles 101 contacts with a part of other conductive micro particles 101, but leaving gaps among the conductive micro particles where the conductive micro particles do not contact each other. The gaps are filled with the colorant material 102. According to the type of the colorant material 102, the color filter becomes the color filter 75R, the color filter 75G or the color filter 75B, which corresponds to three primary colors. In this embodiment, the color filter is described irrespective of a particular color. The diameter of the above-mentioned conductive micro particles lies in the rage of 5-70 nm.

An alignment film 84 to which a certain alignment treatment such as rubbing has been performed and an overcoat 82 is formed above the color filter 75. The alignment film 84 is formed by performing a certain alignment treatment such as rubbing to an organic thin film made of polyimide and the like. The alignment film 84 aligns liquid crystal molecules in a one direction. The overcoat 82 is for eliminating a difference in height of the surface. The overcoat 82 is not essential in this embodiment and provided if necessary.

The liquid crystal layer 70 is disposed between the color filter 75 (and the above alignment film 84) and the opposing substrate 10B. The opposing substrate 10B is a transparent substrate having the opposing electrode 16, which is a common electrode, an overcoat 92 and an alignment film 94 on its upper face (the face opposing the liquid crystal layer 70). The voltage between the color filter 75 and the above-mentioned opposing electrode, which is supplied from the drain 46 of the TFT 40 through the relay electrode 49 that also serves as the pixel electrode, is applied to the liquid crystal layer 70.

In the display device according to this embodiment, the opposing electrode is not patterned because the opposing electrode 16 is a common electrode and it has the same electric potential in its whole area in the display device. The alignment film 94 and the overcoat 92 are neither patterned. Accordingly, it is not necessary to precisely align one substrate with another substrate, and the alignment step can be omitted. Therefore, it is possible to simplify the manufacturing process compared to that of a typical liquid crystal display device in which the color filter is provided on the opposing substrate side.

The functions of the overcoat 92 and the alignment film 94 are the same as those in the above-described TFT array substrate 10A, and the overcoat 92 is not essential neither in the embodiment.

The second embodiment shown in FIG. 5 is hereinafter described. FIG. 5 is the sectional view along the line B-B' in FIG. 3 showing the display device of the second embodiment. In this embodiment, the color filter 75 is formed on the opposing substrate 10B so that the opposing substrate 10B is the color filter substrate.

In the same way as the first embodiment, the third contact hole 58 is formed above the relay electrode 49 that communicates with the drain 46 of the TFT 40. However, the relay electrode 49 is coupled to the pixel electrode 65 instead of the color filter. The overcoat 82 and the alignment film 84 are formed above the pixel electrode 65 and the second interlayer insulating layer 52. The bank 72 is formed on the opposing substrate 10B and the color filter 75 is formed in the area surrounded by the bank 72.

The bank 72 also serves as a black matrix that defines each pixel electrode 110 so that the bank is formed of an opaque material. Alternatively, the black matrix may be separately formed by depositing a thin film of metal and the like, and then the bank may be formed on it.

Like the color filter in the above-described first embodiment, the color filter 75 is composed of a plurality of the conductive micro particles 101 and the colorant material 102. The conductive micro particles aggregate in such a way that a part of the conductive micro particles 101 contacts with a part of other conductive micro particles 101, leaving gaps among the conductive micro particles where the conductive micro particles do not contact each other. The gaps are filled with the colorant material 102. The opposing electrode 16 is formed on the whole surface of the bank 72 and the color filter 75, and the overcoat 92 and the alignment film 94 are formed on the opposing electrode 16. As described above, the color filter 75 is conductive and serves as an electrode together with the opposing electrode 16 as well as a color filter. Since the color filter itself has the conductivity and serves as the secondary electrode, it is possible to obtain a high-quality display.

Method of Manufacturing the Color Filter Substrate

Next, a method of manufacturing the above-described color filter substrate is described.

Figure 6A:
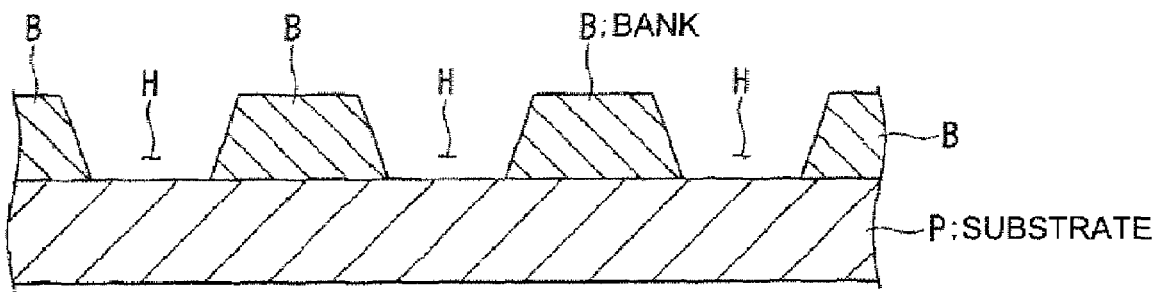
FIGS. 6A through 6C are drawings for illustrating steps in a manufacturing method of the color filter substrate.

To form the color filter substrate, firstly, a bank B is formed on one side of the transparent substrate P as shown in FIG. 6A.

A substrate made of various materials such as glass, a quartz glass, a Si wafer, a plastic film and a metal substrate can be used as the base substrate P. Furthermore, the base substrate includes a substrate on which a semiconductor film, a metal film, a dielectric film, an organic film and the like is formed as a foundation layer. Particularly, if the substrate P is the array substrate having pixel switching elements, wirings and the like, it is possible to form a color filter on array (COA) structure.

The bank B serves as a partition member that defines the area where the color filter is formed. The bank B has a plurality of openings H that corresponds to the picture element pattern. In the manufacturing method of the color filter substrate according to the invention, a liquid material is disposed in a region defined by the bank B, and the liquid material is dried so as to form a film pattern on the substrate P. In this case, the shape of the film pattern is determined by the banks B, the film pattern can be made finer with thinner lines by appropriately changing the configuration of the bank B, for example, by making the width between the adjacent banks B narrower.

One of the methods to form the bank B is that the bank material is formed on the substrate P by various coating methods or a chemical vapor deposition (CVD) method and the bank material is then patterned by etching or ashing to obtain the bank B having a predetermined shape. Alternatively, the bank B may be separately formed on a different place other than the substrate P, and the formed bank B is then disposed on the substrate P.

As the material forming the bank B, there are high-polymer materials such as an acrylic resin, a polyimide resin, an olefin resin and a melamine resin. Inorganic material can be used to form the bank B in consideration of heat resistance and the like. Such inorganic material includes polymeric inorganic compounds and photosensitive inorganic compounds that contain silicon in their polymeric chain framework such as polysilazane, polysiloxane, a siloxane-series resist and a polysilane-series resist having silicon in its framework. The inorganic material further includes spin-on glass films, diamond films and fluorinated amorphous carbon films that contain at least one of silica glass, an alkylsiloxane polymer, an alkylsilsesquioxane polymer, a hydrogenated alkylsilsesquioxane polymer and polyarylether. Moreover, aerogel, porous silica and the like can also be used as the inorganic bank material. It is preferable that the photosensitive material such as the photosensitive polysilazane composition including the polysilazane and a photo-oxidation product because the forming process will not require a resist mask.

As such photosensitive polysilazane, for example, the polysilazane disclosed in JP-A-2002-72504 can be named. An example of the photo-oxidation product contained in the polysilazane is also disclosed in JP-A-2002-72504.

In a case that the polysilazane is a polymethylsilazane presented by chemical formula (1) written below, a part of the polymethylsilazane is hydrolyzed by a hydration treatment which is described later as shown in chemical formula (2) and chemical formula (3). By further conducting a heat treatment lower than 350° C., it is condensed as shown in chemical formulas (4) through (6) and turns into polymethylsiloxane [—(SiCH$_3$O1.5)n-]. If a heat treatment higher than 350° C. is carried out, desorption of a side-chain methyl group occurs. Especially, the heat treatment higher of 400-450° C. desorbs almost all the side-chain methyl groups and the polymethylsilazane turns into polysiloxane, though its chemical reaction is not shown as the chemical formulae here. It is note that chemical formulas (2) through (6) are simplified and only basic constituent units (repeat units) in the chemical compounds are shown in order to simply explain the reaction mechanism.

The polymethylsiloxane or the polysiloxane produced in the above-described way has the polysiloxane framework which is inorganic so that a film of these compounds becomes sufficiently dense. Accordingly, the surface of the film becomes appropriately flat and even. In addition, it has a high heat resistance, and this film is appropriate for the bank material.

Chemical Formulae

$$—(SiCH_3(NH)_{1.5})n— \quad (1)$$

$$SiCH_3(NH)_{1.5}+H_2O \rightarrow SiCH_3(NH)(OH)+0.5NH_3 \quad (2)$$

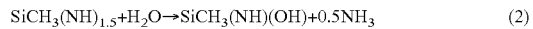

$$SiCH_3(NH)_{1.5}+2H_2O \rightarrow SiCH_3(NH)_{0.5}(OH)_2+NH_3 \quad (3)$$

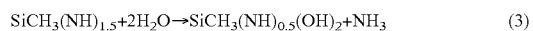

$$SiCH_3(NH)(OH)+SiCH_3(NH)(OH)+H_2O \rightarrow 2SiCH_3O_{1.5}+2NH_3 \quad (4)$$

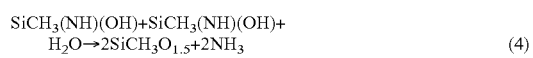

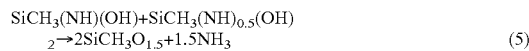

$$SiCH_3(NH)(OH)+SiCH_3(NH)_{0.5}(OH)_2 \rightarrow 2SiCH_3O_{1.5}+1.5NH_3 \quad (5)$$

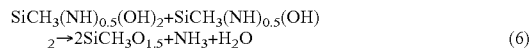

$$SiCH_3(NH)_{0.5}(OH)_2+SiCH_3(NH)_{0.5}(OH)_2 \rightarrow 2SiCH_3O_{1.5}+NH_3+H_2O \quad (6)$$

The bank B is treated so as to have a lyophobic or lyophilic quality if necessary.

As a treatment to impart the lyophilic quality to the bank, there are a plasma treatment using oxygen gas (O2 plasma treatment and the like), an ultraviolet exposure treatment in oxygen atmosphere and so on.

As a treatment to impart the lyophobic quality to the bank, a plasma treatment using a gas (fluorine-including gas) including fluoride such as $CH_4$, $SF_6$ and $CHF_3$ can be carried out. In stead of performing such treatment, a lyophobic component (fluorine group and the like) may be added to the material of the bank B before forming the bank.

The inner parts of the bank B are made lyophilic and the outer surface of the bank B is made lyophobic by performing such lyophilic treatment and lyophobic treatment consecutively. In this way, it is possible to form the film only in the opening H of the bank B and prevent an unnecessary film from being formed on the upper surface of the bank B.

The opening H defined by the bank B corresponds to the picture element pattern arranged in matrix. In this embodiment, the openings H are formed in matrix (see FIG. 1). The matrix form color filter corresponding to the picture elements is formed by providing the liquid material in the openings H.

Figure 6B:
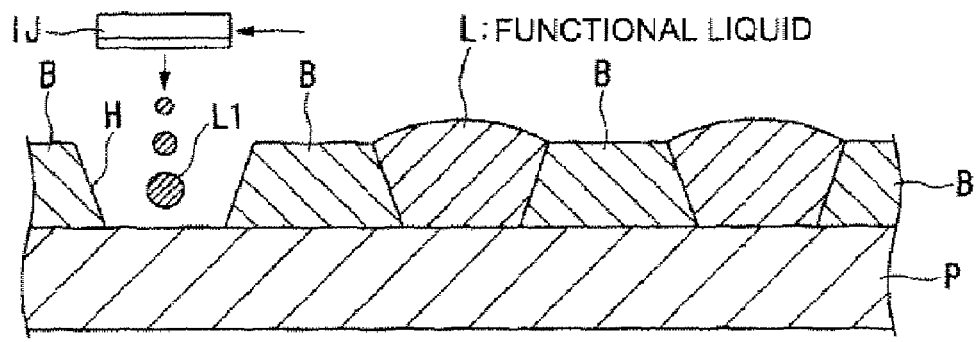

Next, a liquid material L1 including a transparent conductive micro particles Fp (see FIG. 6C) is provided in the area (the opening H) defined by the bank B as shown in FIG. 6B.

Transparent conductive micro particles made of indium tin oxide (ITO), indium zinc oxide (IZO) and oxides of indium, tin, zinc and the like can be used as the transparent conductive micro particles Fp. The surface of the transparent conductive micro particles may be coated with organic substance and the like in order to improve its dispersibility.

The size of the transparent conductive micro particles Fp is preferably smaller than 200 nm, more preferably, 5-70 nm.

When the size of the transparent conductive micro particles is smaller than 5 nm, resistance per micro particles becomes large and it could cause trouble when it is used as the pixel electrode and the like. In this embodiment of the invention, the conductive color filter is formed by impregnating the film composed of the transparent conductive micro particles Fp with colorant material such as pigments. Therefore, if the micro particles is too small, the gap among the micro particles becomes too narrow for the colorant material to permeate there.

On the other hand, when the size of the micro particles is larger than 70 nm, the contact area of the micro particles becomes smaller and the resistance of the whole film becomes larger though the resistance of each micro particles becomes smaller. Furthermore, a nozzle of a liquid discharge head could be clogged with the large micro particles and it could deteriorate the density of the obtained film.

As for a method of providing the liquid material L1 onto the area defined by the bank B, a droplet discharge method or so called ink-jet method is preferably adopted. By using the droplet discharge method, the liquid material is less wasted and the amount and position of the functional liquid disposed on the substrate can be easily controlled, compared to the other coating techniques such as a spin coating method.

A dispersion medium of the liquid material L1 is not particularly limited as long as it can disperse the above-mentioned transparent conductive micro particles Fp therein without condensation. For example, the examples include, in addition to water, alcohol such as methanol, ethanol, propanol and butanol, hydrocarbon compounds such as n-heptane, n-octane, decane, decane, dodecane, tetradecane, toluene, xylene, cymene, dulene, indent, dipentene, tetrahydronaphthalene, decahydronaphthalene and cyclohexylbenzene, ether compounds such as ethyleneglycoldimethyl ether, ethyleneglycoldiethyl ether, ethyleneglycolmethylethyl ether, diethyleneglycoldimethyl ether, diethylenglycoldiethyl ether, diethyleneglycolmethylethyl ether, 1,2-dimethoxyethane, bis(2-methoxyethyl)ether, and p-dioxane, and polar compounds such as propylene carbonate, [gamma]-butyrolactone, N-methyl-2-pyrolidone, dimethylformamide, dimethylsulfoxide and cyclohexanone. Among these, water, alcohol, hydrocarbon compounds and ether compounds are preferable in terms of the dispersibility of the micro particles, stability of the dispersion liquid, and easy application to the droplet discharge method (inkjet method). Water and hydrocarbon compounds are especially preferable as the dispersion medium.

It is preferable that the surface tension of the dispersion liquid of the above-mentioned transparent conductive micro particles is within the range of 0.02-0.07 N/m. This is because when liquid is discharged by the droplet discharge method, if the surface tension is less than 0.02 N/m, the wettability of the ink composition with respect to the nozzle surface increases so that the discharge direction tends to deviate. If the surface tension exceeds 0.07 N/m, the shape of the meniscus at the tip of the nozzle becomes unstable, making it difficult to control the discharge amount and the discharge timing. A good way to adjust the surface tension is to add a small amount of a surface tension modifier such as a fluorine group, silicon group, nonionic group, into the above-mentioned dispersion liquid to an extent not to largely decrease the contact angle with the substrate. The nonionic surface tension modifier increases the wettability of the liquid on the substrate, improves the leveling property of the film, and helps to prevent the occurrence of minute ruggedness on the film. The above-mentioned surface tension modifier may contain organic compounds such as alcohol, ether, ester, ketone, and the like according to need.

The viscosity of the above-mentioned dispersion liquid preferably lies in the range of 1-50 mPa·s. This is because when the liquid material is discharged in a droplet form by the droplet discharge method, if the viscosity is smaller than 1 mPa·s, the area around the nozzle is easily contaminated by discharged ink. If the viscosity is higher than 50 mPa·s, the frequency of clogging occurring at the nozzle hole increases, making it difficult to smoothly discharge droplets.

Discharging techniques of the droplet discharge method include an electrification controlling method, a pressurizing and oscillating method, an electromechanical converting method, an electro-thermal converting method, an electrostatic attracting method and the like.

In the electrification controlling method, electric charges are given to a material through an electrification electrode and the material is discharged from the nozzle. The discharge direction of the material can be controlled by a deflecting electrode. In the pressurizing and oscillating method, a high pressure of about 30 kg/cm$^2$ is applied to a material so as to discharge the material from the tip of the nozzle. When a control voltage is not applied, the material goes straight and is discharged from the nozzle. When the control voltage is applied, due to an electrostatic repulsion generated in the material, the material is dispersed and will not be discharged from the nozzle. In the electrothermal converting method, a piezoelectric element deforms when it receives a pulsed electric signal. The electrothermal converting method utilizes this property and the deformation of the piezo element gives a pressure through a flexible substance to a space storing a material. The material is then pushed out of the space and discharged from the nozzle.

In the electrothermal converting method, a material is rapidly gasified so as to generate bubbles by a heater provided in a space storing the material, so that the material in the space is pushed out and discharged by the pressure of the bubbles. In the electrostatic attracting method, a micro-pressure is applied to a space storing a material and a meniscus of the material is formed in the nozzle, in which state an electrostatic attractive force is applied so as to draw the material out. In addition to these methods, a technique using a viscosity variation of a fluid due to an electric field, a technique that blows the material out by an electric discharge spark and the like are also applicable. The advantage of the droplet discharge method is that the amount of waste in the used material becomes less, and the desired amount of the material can be surely disposed at a desired position. The amount of one drop of a liquid material discharged by the droplet discharge method will be, for example, 1-300 ng.

Figure 8:
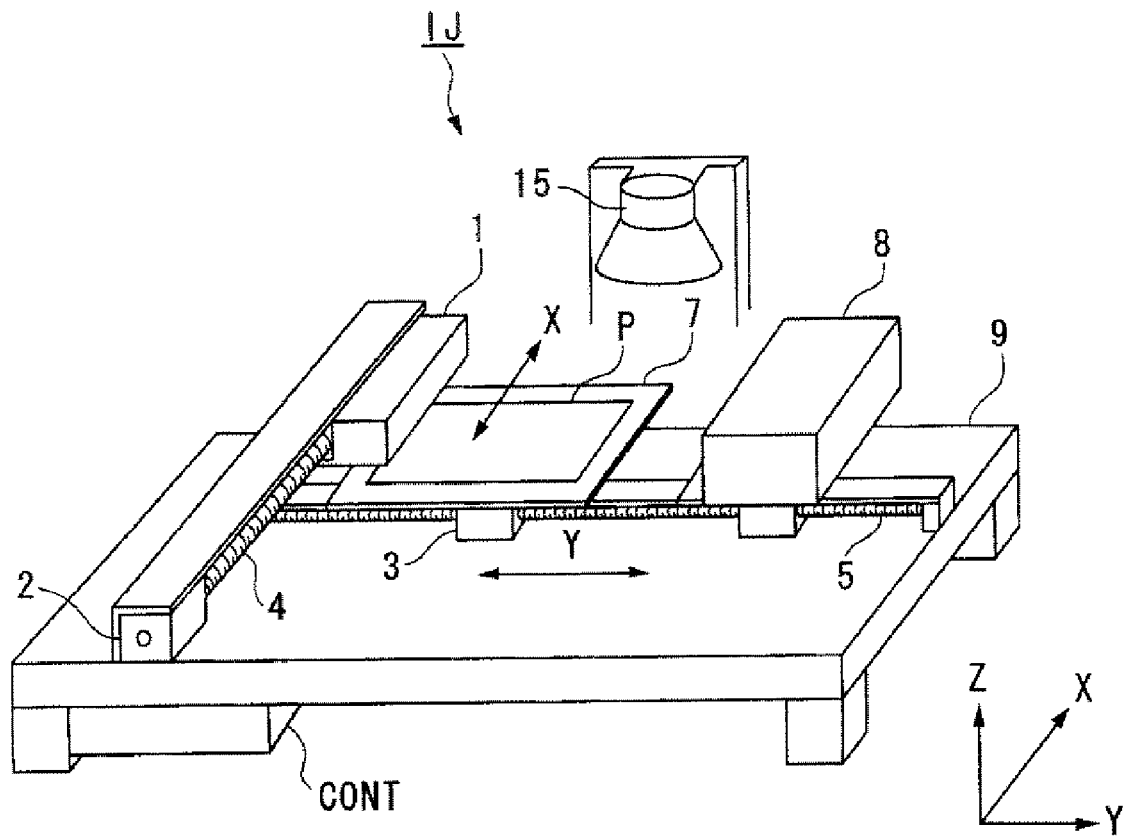
FIG. 8 is a schematic perspective view of a droplet discharge device.

FIG. 8 is a schematic perspective view showing an overall structure of a droplet discharge device IJ (ink-jet device) that provides the liquid material onto the substrate by the droplet discharge method as an example of the device used to form the film pattern according to the invention.

The droplet discharge device IJ has a droplet discharge head 1, an X-way drive axis 4, a Y-way guide axis 5, a controller CONT, a stage 7, a cleaning mechanical section 8, a table 9 and a heater 15.

The stage 7 surmounts the substrate P to which ink (the liquid material) is provided by the droplet discharge device IJ. The stage 7 has an unshown feature to fix the substrate P in a reference position.

The droplet discharge head 1 is a multi-nozzle type head equipped with a plurality of discharge nozzles. A Y-axis direction corresponds to the longitudinal direction of the droplet discharge head 1. A discharge nozzle is provided in the plural number on a lower face of the droplet discharge head 1. The nozzles align in the Y-axis direction and are provided with a regular space therebetween. From the nozzle of the droplet discharge head 1, the ink including the above-mentioned conductive micro particles is discharged to the substrate P that is held by the stage 7.

An X-way driving motor 2 is coupled to the X-way drive axis 4. The X-way driving motor 2 is a stepping motor and the like, and rotates the X-way drive axis 4 when an X-way driving signal is provided from the controller CONT. When the X-way drive axis 4 is rotated, the droplet discharge head 1 moves in an X-axis direction.

The Y-way guide axis 5 is fixed in such a way that its position will not move against the table 9. The stage 7 has a Y-way driving motor 3. The Y-way driving motor 3 is a stepping motor and the like. When a Y-way driving signal is provided from the controller CONT, the Y-way driving motor 3 moves the stage 7 in the Y-axis direction.

The controller CONT supplies a voltage that controls the discharge of droplets to the droplet discharge head 1. The controller CONT also supplies a drive pulse signal for controlling an X-axis direction movement of the droplet discharge head 1 to the X-way driving motor 2. The controller CONT also supplies a drive pulse signal for controlling a Y-axis direction movement of the stage 7 to the Y-way driving motor 3.

The cleaning mechanical section 8 cleans the droplet discharge head 1. The cleaning mechanical section 8 has an unshown Y-directional driving motor. The cleaning mechanical section 8 is driven by the driving motor and moves along with the Y-way guide axis 5. This movement of the cleaning mechanical section 8 is also controlled by the controller CONT.

The heater 15 is used to perform a heat treatment of the substrate P by lamp annealing. Solvent contained in the liquid material that is applied to the substrate P will be evaporated and dried with the heater 15. Power on and off of this heater 15 is also controlled by the controller CONT.

The droplet discharge device IJ discharges a droplet to the substrate P as relatively moving the droplet discharge head 1 and the stage 7 that supports the substrate P. In the following description, the X-axis direction is the scan direction and the Y-axis direction which is orthogonal to the X-axis direction is a non-scan direction. Accordingly, the discharge nozzles of the droplet discharge head 1 align in the Y-axis direction or the non-scan direction and are provided with a regular space therebetween. Though the droplet discharge head 1 is placed orthogonal to the traveling direction of the substrate P as shown in FIG. 8, the installed angle of the droplet discharge head 1 can be adjusted so as to cross the traveling direction of the substrate P. By adjusting the angle of the droplet discharge head 1, it is possible to control the pitch between the nozzles. Furthermore, the distance between the substrate P and the nozzle face may be made freely adjustable.

Figure 9:
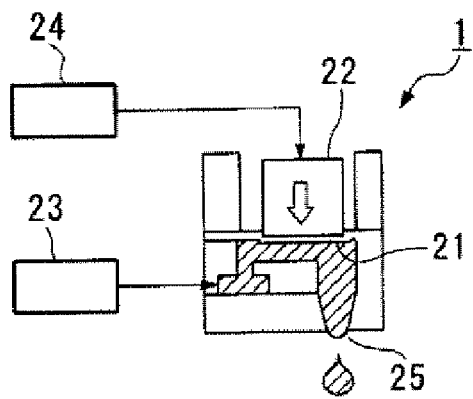
FIG. 9 illustrates a droplet discharge mechanism by a piezo method.

FIG. 9 is an explanatory drawing for explaining the discharge mechanism of the liquid material by a piezo method.

In FIG. 9, a piezo element 22 is provided adjacent to a liquid room 21 in which the liquid material (ink used for the wiring pattern, functional liquid) is kept.

The liquid material is supplied to the liquid room 21 through a liquid material supply system 23 including a material tank that stores the liquid material. The piezo element 22 is coupled to a driving circuit 24. Voltage is applied to the piezo element 22 through the driving circuit 24 and the piezo element 22 is deformed. The liquid room 21 is deformed by the deformation of the piezo element 22 and the liquid material is discharged from a nozzle 25. In this case, a degree of distortion of the piezo element 22 is controlled by changing a value of the applied voltage. A distortion speed of the piezo element 22 is controlled by changing a frequency of the applied voltage.

In the droplet discharge by the piezo method, the material will not be heated so that it has an advantage that composition of the material is hardly affected.

Back to FIG. 2, after the liquid material L1 is discharged within the area of the bank B, a drying process is performed if necessary in order to remove the dispersion medium. The drying process may be performed by a commonly used heating method to heat the substrate P, for example, a hot plate, an electric furnace and the like are used for the drying process. Conditions of the heating are, for example, 180° C. of the baking temperature and about 60 minutes of the heating time. This heating treatment may be conducted in a nitrogen gas atmosphere and the like other than the normal atmosphere.

Figure 6C:
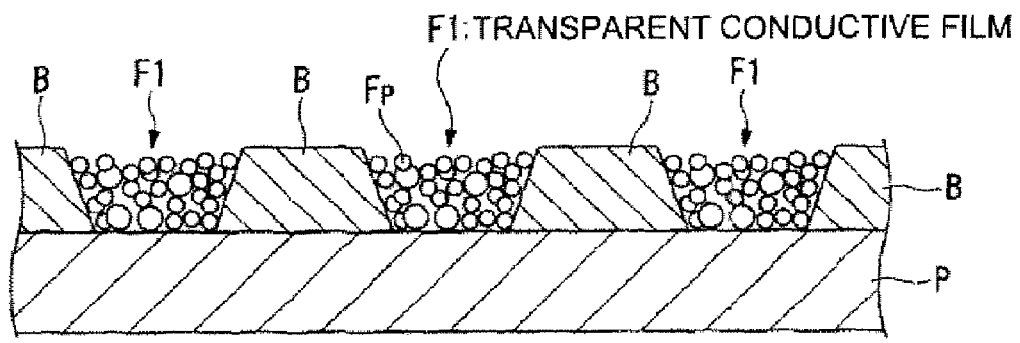

This drying process can also be carried out by lamp annealing. The light source of the lamp annealing is not particularly limited, though an infrared lamp, a xenon lamp, a YAG laser, an argon laser, a carbon dioxide gas laser, and excimer lasers such as XeF, XeCl, XeBr, KrF, KrCl, ArF and ArCl can be used as the light source. These light sources generally have an output range of above 10 W and below 5000 W. However one in a range of above 100 W and below 1000 W is sufficient for this embodiment, The volume of the liquid material L1 is decreased by the dry process because the solvent in the liquid material L1 evaporates during the dry process. In case where the volume declines too sharply, the droplet discharge process and the dry process are alternatively repeated. Through such process, the solvent in the liquid material L1 is evaporated and only a solid content in the liquid material L1 eventually remains and forms a film. In the end, a transparent conductive film F1 is formed as shown in FIG. 6C. The transparent conductive film F1 is composed of the plurality of the transparent conductive micro particles Fp and gaps (voids) are formed among the transparent conductive micro particles Fp.

It is necessary to completely remove the dispersion medium from the dried film F1 after the discharge process in order to increase the electrical contact among the transparent conductive micro particles. Moreover, in the case where a coating material such as organic matter is coated on the surfaces of the transparent conductive micro particles for the sake of the dispersibility, it is also necessary to completely remove this coating material. For this purpose, a heat treatment and/or a light treatment is performed to the substrate after the discharge process.

This heat treatment and/or light treatment is normally performed in air. However it may be performed in an inert gas atmosphere such as nitrogen, argon and helium where appropriate. The treatment temperature (baking temperature) of the heat treatment and/or light treatment is appropriately determined considering the boiling point (vapor pressure) of the dispersion medium, the type and the pressure of the atmosphere gas, the thermal behavior such as the dispersibility or the oxidizability of the micro particles, the presence/absence of the coating, and the heat resistant temperature of the base substrate (including the substrate P and the bank B). In this embodiment, the baking temperature is preferably set as high as possible within the allowable range concerning the heat resistance of the bank and the like in order to lower the resistance of the transparent conductive film F1. For example, when the substrate P includes an amorphous silicon TFT, the baking temperature will be about 300° C. When the substrate P includes a low-temperature polysilicon TFT, the baking temperature will be about 400° C. In case where such high temperature heating process is performed, the bank B is preferably made of inorganic material such as polysilazane. Furthermore, it is preferable that the heating process is carried out in the atmosphere which does not contain oxygen gas. Though the above-described process, the electrical contact among the micro particles is secured and the dried film F1 after the discharge process turns into the conductive film.

In this embodiment, the thickness of the transparent conductive film F1 is preferably 500-2000 nm, more preferably, 1000-1500 nm. If the film is thinner than 500 nm, an adequate electric property cannot be obtained when the film is used as the pixel electrodes and the like. If the film is thicker than 2000 nm, the color of the film could become too dark as a color filter. According to the invention, the conductive color filter is formed by impregnate the transparent conductive film F1 with the colorant material as hereinafter described. Therefore, the color properties of the color filter such as hue, brightness, saturation and the like are changed when the transparent conductive film is too thick. This would impair a fine display property. For this reason, in this embodiment, the thickness of the transparent conductive film is adequately adjusted according to the color property required as the color filter.

The transparent conductive film formed by the liquid discharge method has a relatively small film density since gaps among the transparent conductive micro particles Fp. Therefore, even if a relatively thick film is formed by the droplet discharge method, it is possible to secure the transparency of the film. The relatively thick film rather has a function of an antireflection film so that the display property can be improved. On the other hand, the transparent conductive film formed by sputtering has a high density and it is not easy to impregnate the film with the colorant material such as pigments. In addition, if a relatively thick film is formed by the sputtering, the light transmissivity will drop sharply. Therefore, it is difficult to appropriately adjust the film thickness according to the required color properties of the color filter.

Figure 7A:
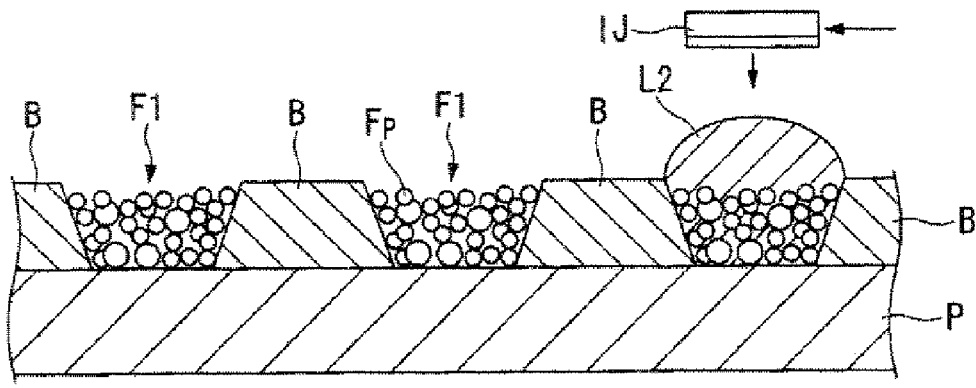
FIGS. 7A through 7C are drawings for illustrating steps following FIG. 6C.

After the transparent conductive film F1 is heated, as shown in FIG. 7A, a liquid material L2 including a colorant material $F2_B$ (see FIG. 7B) that forms the color filter is disposed in the opening H of the bank B where the transparent conductive film F1 has formed.

Micro particles colorant material such as pigments can be used as the colorant material $F2_B$. In this embodiment, the colorant material $F2_B$ is heated separately from the heating process of the transparent conductive film F1. Accordingly, dye materials which have lower baking temperature than that of the transparent conductive film F1 can be used as the colorant material $F2_B$. The surface of the colorant material may be coated with a coating material in order to improve the dispersibility of the micro particles in the liquid material.

The droplet discharge method is preferably used to dispose the liquid material L2 onto the area defined by the bank B. The gaps among the transparent conductive micro particles Fp are filled with the colorant material $F2_B$ in the liquid material L2, which colors the transparent conductive film F1 with a predetermined color.

After discharging the liquid material L2 onto the area in the bank B, the drying process is performed in order to remove the dispersion medium if necessary. The same drying method and conditions as those of the liquid material L1 the can be adapted to the liquid material L2.

The droplet discharge process and the drying process may be repeated till the whole of the transparent conductive film F1 is impregnated with the colorant material $F2_B$ of the liquid material L2, After the transparent conductive film F2 is formed, the dispersion medium should be completely removed. Moreover, in the case where a coating material such as organic matter is coated on the surfaces of the transparent conductive micro particles for the sake of the dispersibility, it is also necessary to completely remove this coating material. For this purpose, a heat treatment and/or a light treatment is performed to the substrate after the discharge process.

This heat treatment and/or light treatment is normally performed in air. However it may be performed in an inert gas atmosphere such as nitrogen, argon and helium where appropriate. The treatment temperature (baking temperature) of the heat treatment and/or light treatment is appropriately determined considering the boiling point (vapor pressure) of the dispersion medium, the type and the pressure of the atmosphere gas, the thermal behavior such as the dispersibility or the oxidizability of the micro particles, the presence/absence of the coating, and the heat resistant temperature of the base substrate (including the substrate P and the bank B). In this embodiment, the base film or the transparent conductive film F1 has been already heated so that the baking temperature is decided only depending on the decomposition temperature of the coating material and the colorant material $F2_B$ and the like. For example, if the colorant material $F2_B$ is pigment micro particles, the heating treatment is performed at a temperature lower than the decomposition temperature of the pigment micro particles that is about 230° C.

Figure 7B:
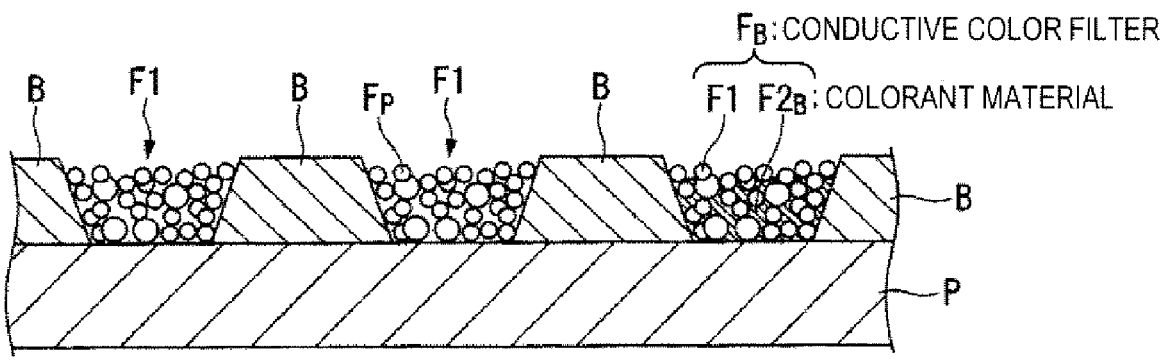
Figure 7C:
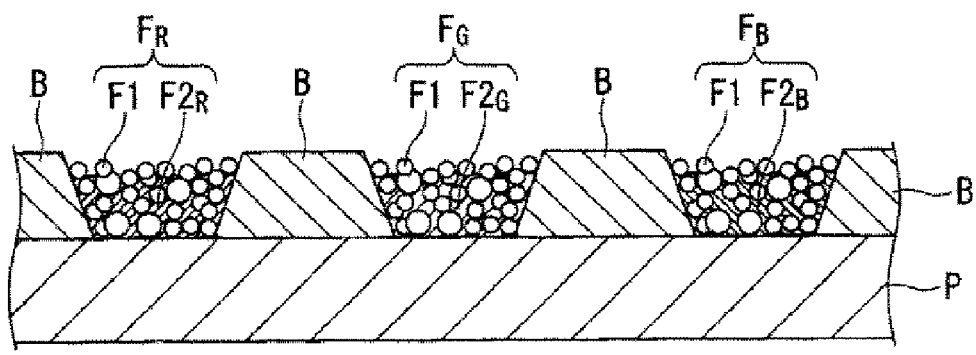

Though the above-mentioned process, a conductive color filter $F_B$ that has a predetermined electric property is formed in the area defined by the bank B as shown in FIG. 7B. The color filter $F_B$ can be, for example, a blue color filter including the blue colorant material $F2_B$ and the transparent conductive micro particles Fp.

In the same way as described above, other openings H of the transparent conductive film F1 are impregnated with green colorant material $F2_G$ and red colorant material $F2_R$ and then the film is baked so as to form a green color filter $F_G$ and a red color filter $F_R$. The formation order of the color filters $F_R$, $F_G$, $F_B$ is not especially limited and any colored color filter can be firstly formed.

If necessary, a protection film and the like may be further formed on the substrate surface after the color filter is formed.

According to the embodiment, the colorant materials $F2_R$, $F2_G$, $F2_B$ are impregnated and baked after the transparent conductive film F1 has formed. Accordingly, the baking temperature of the transparent conductive film F1 can be set to a higher temperature than the decomposition temperature of the colorant materials $F2_R$, $F2_G$, $F2_B$. This makes it possible to obtain fine film conductivity.

Furthermore, the bank for the transparent conductive film can also be used as the bank for the colorant material according to the embodiment. Accordingly, the manufacturing process can be simplified and it is possible to cut the cost.

The transparent conductive film F1 composed of the transparent conductive micro particles Fp has a smaller film density compared to that of the film formed by sputtering and the like so that the transmissivity will not sharply decrease even if the film thickness increases. Therefore, the thickness of the transparent conductive film F1 that is the base film can be easily controlled according to the required color properties of the color filters $F_R$, $F_G$, $F_B$.

Moreover, compared to the case where the color filter is formed without using the bank B, the embodiment can improve the surface property of the substrate P because the color filters $F_R$, $F_G$, $F_B$ are formed in the areas defined by the banks B. Therefore, when the substrate P is adopted as an array substrate (COA structure) of a liquid crystal display device, for example, leakage of light beam leaked from the peripheral of the picture elements will be small and a high contrast display is possible.

Though the color filters are arranged in the stripe pattern in this embodiment, the arrangement pattern of the color filter is not limited to this but various patterns as shown in FIG. 6 can be adopted. For example, a mosaic pattern as shown in FIG. 10B, a delta pattern as show in FIG. 10C can be adopted in addition to the stripe pattern shown in FIG. 10A. According to the embodiments of the invention, the color filters $F_R$, $F_G$, $F_B$ are formed by impregnating the gaps among the transparent conductive micro particles Fp with the colorant materials $F2_R$, $F2_G$, $F2_B$. Therefore, unlike the electrodeposition method, the manufacturing method of the invention can be applied to any layouts of the color filter and various arrangements or structures including the stripe and delta arrangement patterns.

Electronic Equipment

Next, an example of electronic equipment having the above-described display device according to the embodiment is described.

Figure 11:
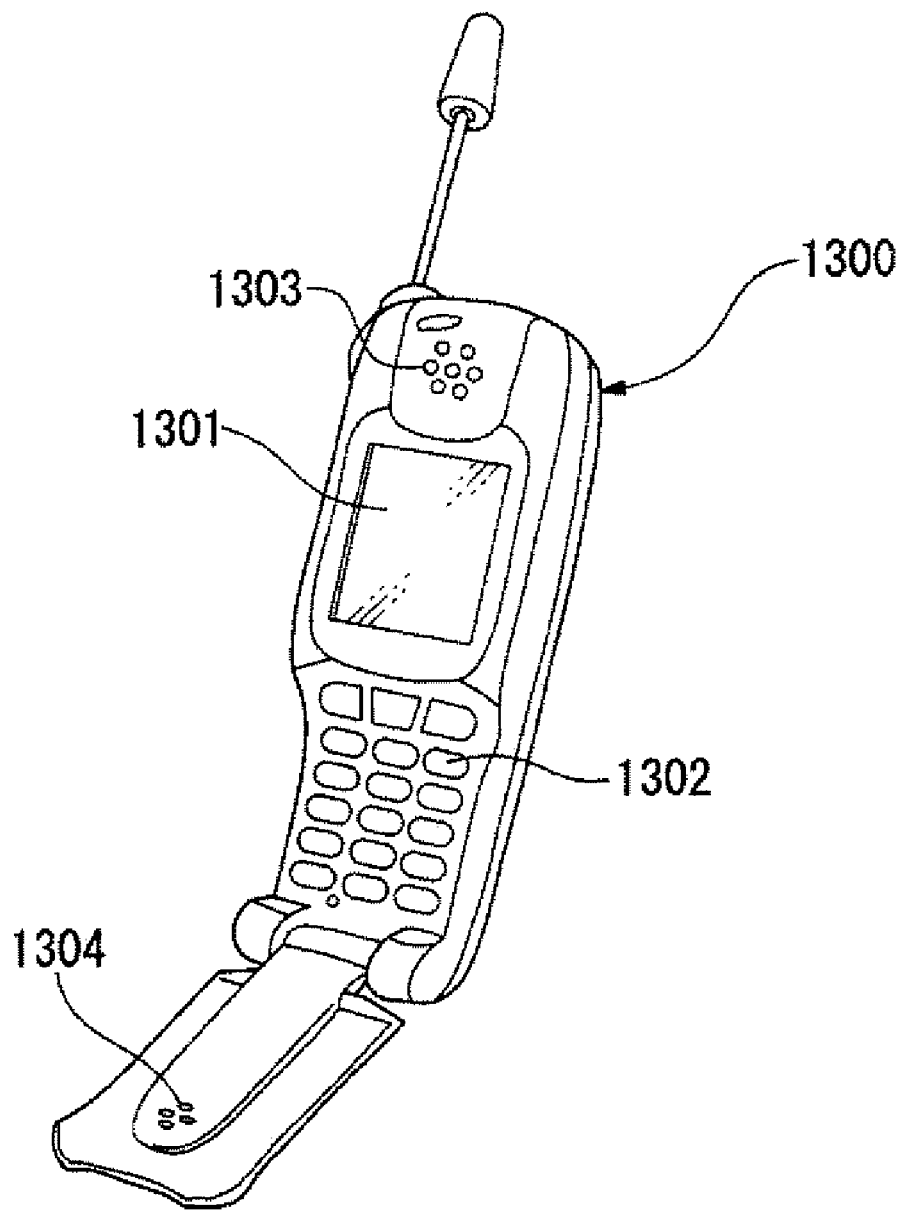
FIG. 11 is a perspective view showing an example of electronic equipment according to the invention.

FIG. 11 is a perspective view showing the example of electronic equipment according to the invention.

As shown in FIG. 11A, a mobile phone 1300 which is the electronic equipment includes a small size display part 1301 which is the display device according to the embodiment of the invention, a plurality of manual operation buttons 1302, an ear piece 1303 and a mouth piece 1304.

The display device according to the embodiment of the invention can also be applied as an image display means of an electronic book, a personal computer, a digital still camera, a liquid crystal television, a view finder type or direct view type video tape recorder, a car navigation device, a pager, an electronic databook, a calculator, a word processor, a work station, a videophone, a point-of-sale terminal, equipments having a touch panel and the like, in addition to the above-mentioned mobile phone. Any electronic equipment with the display device according to the embodiment of the invention shows high display quality and credibility.

The foregoing description has been given by way of example only and does not in any way limit the scope of the invention. It will be appreciated by a person skilled in the art that modifications can be made without departing from the scope of the invention and all of the elements of the above-described embodiments should not be taken as essential requirements to the means of the invention. The invention can be broadly applied to manufacturing methods of a color filter substrate that has a transparent conductive film and colorant material.

What is claimed is:

1. A method of manufacturing a color filter substrate having a transparent conductive film and colorant material on a substrate, comprising:

forming a bank on the substrate;

disposing a liquid material including transparent conductive micro particles in an area defined by the bank;

forming the transparent conductive film by baking the transparent conductive micro particles;

impregnating gaps among the transparent conductive micro particles in the transparent conductive film with the colorant material; and baking the colorant material.

2. The method of manufacturing a color filter substrate according to claim 1, wherein the gaps in the film are impregnated with the colorant material by disposing a liquid material including the colorant material in the area defined by the bank.

3. The method of manufacturing a color filter substrate according to claim 2, wherein the liquid material including the colorant material is disposed in the area by a droplet discharge method.

4. The method of manufacturing a color filter substrate according to claim 1, wherein the liquid material including the transparent conductive micro particles is provided in the area by a droplet discharge method.

5. The method of manufacturing a color filter substrate according to claim 1, wherein the bank is made of material that has a polysiloxane framework.

* * * * *